United States Patent
Spraetz et al.

(10) Patent No.: US 7,717,222 B2
(45) Date of Patent: May 18, 2010

(54) SNOWMOBILE THROTTLE CONTROL TOP HAT DESIGN

(75) Inventors: Zachary T. Spraetz, Rochester, IL (US); Albert Boyd Cable, Springfield, IL (US)

(73) Assignee: Honeywell International Inc., Morristown, NJ (US)

( * ) Notice: Subject to any disclaimer, the term of this patent is extended or adjusted under 35 U.S.C. 154(b) by 327 days.

(21) Appl. No.: 11/435,337

(22) Filed: May 16, 2006

(65) Prior Publication Data

US 2007/0267242 A1    Nov. 22, 2007

(51) Int. Cl.
  *G05G 1/04* (2006.01)
  *B60K 31/00* (2006.01)
(52) U.S. Cl. .................... 180/335; 74/501.6; 74/523
(58) Field of Classification Search ............. 74/491, 74/501.6, 519, 523; 123/396, 397, 400; 180/190, 180/272, 335; 200/51 LM, 52 R, 61.87
  See application file for complete search history.

(56) References Cited

U.S. PATENT DOCUMENTS

| | | | |
|---|---|---|---|
| 3,583,506 A * | 6/1971 | Preble | 180/335 |
| 3,694,596 A | 9/1972 | Carlson | |
| 3,758,736 A * | 9/1973 | Tanaka | 200/557 |
| 3,769,481 A * | 10/1973 | Raab | 200/518 |
| 3,789,938 A * | 2/1974 | Hetteen | 180/190 |
| 3,798,402 A * | 3/1974 | Raab | 200/546 |
| 3,845,847 A * | 11/1974 | Camp | 477/204 |
| 4,186,291 A | 1/1980 | Swanson | 200/61.86 |
| 4,213,513 A | 7/1980 | Beck | |
| 4,237,997 A | 12/1980 | Swanson | 180/272 |
| 4,773,371 A * | 9/1988 | Stenz | 123/376 |
| 4,899,610 A | 2/1990 | Bourret | |
| 5,445,121 A * | 8/1995 | Kai | 123/198 DC |
| 6,134,984 A * | 10/2000 | Hisadomi | 74/502.2 |
| 6,170,590 B1 | 1/2001 | Hisadomi | 180/190 |
| 6,393,933 B2 * | 5/2002 | Shirayanagi | 74/489 |
| 6,712,173 B2 | 3/2004 | Esselink | 180/319 |
| 6,920,805 B2 * | 7/2005 | Samoto et al. | 74/485 |

* cited by examiner

*Primary Examiner*—Paul N Dickson
*Assistant Examiner*—Laura Freedman

(57) ABSTRACT

A snowmobile throttle control apparatus includes a pair of bushings with a hole and closed ends and a separate axle pin. The bushings are assembled to a thumb lever and mounted over the axle pin. The axle pin allows for a controlled gap to be maintained between the throttle lever, bushing assembly and the control housing. The thumb lever is allowed to flex open when a side load is applied. Thus allowing the thumb lever assembly to travel without binding on the control housing. This insures proper functioning of the RPS feature.

19 Claims, 5 Drawing Sheets

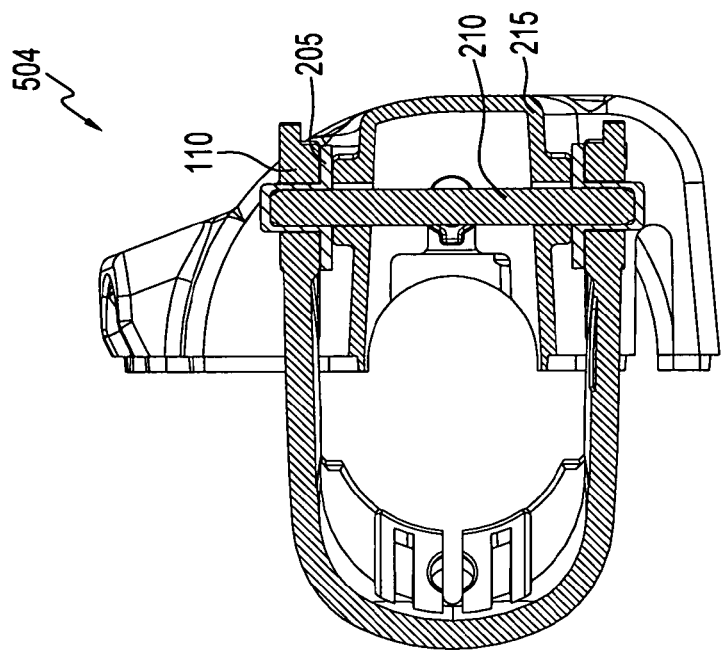
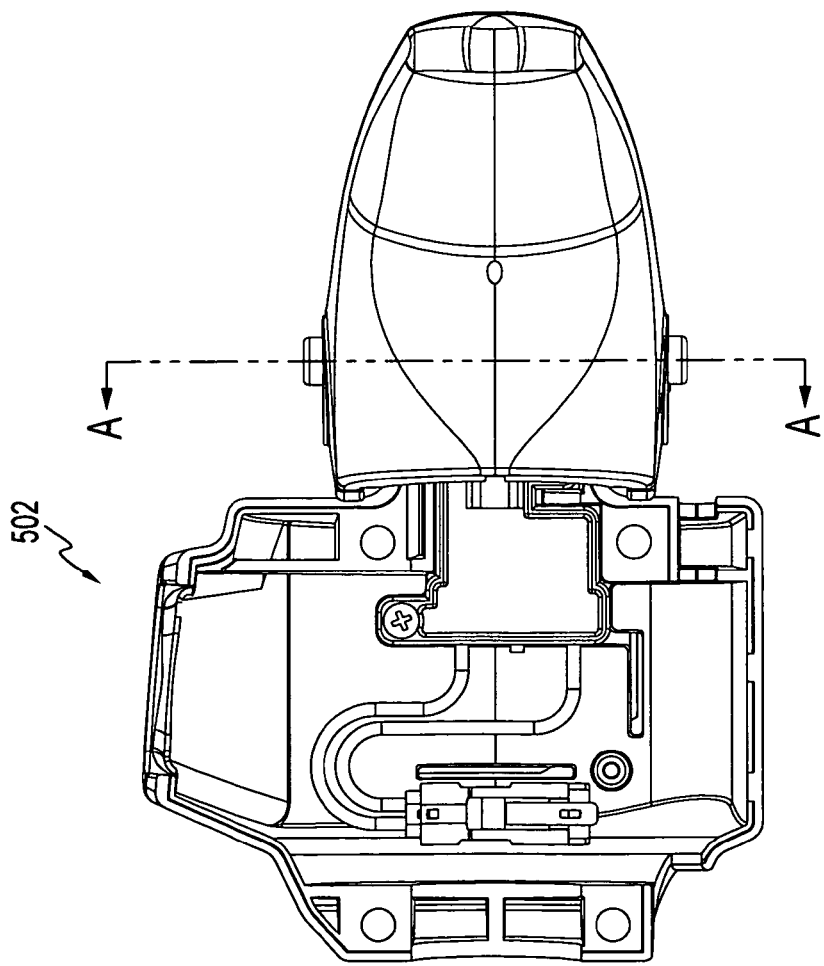
FIG. 5B
FIG. 5A

US 7,717,222 B2

SNOWMOBILE THROTTLE CONTROL TOP HAT DESIGN

TECHNICAL FIELD

Embodiments are generally related to the field of throttle controls for recreational vehicles such as snowmobiles. Embodiments are also related to snowmobile throttle control levers.

BACKGROUND OF THE INVENTION

Many different types of recreational vehicles have been developed and are used by sports enthusiasts. Recreational vehicles include, for example, vehicles such as boats, airplanes, gliders, motorcycles, ATVs (all-terrain vehicles), snowmobiles and the like. Different environments are used for different recreational vehicles. Specifically, in water environments, recreational vehicles are boats or jet skis; in air environments the recreational vehicles are hang gliders or airplanes; in sand the recreational vehicles are dune buggies or ATVs; and in snow environments the recreational vehicle of choice is usually a snowmobile.

At least since the early 1960's snowmobiles have been used by sports enthusiasts in winter environments. Snowmobiles can travel on snow by the use of two front skis and a track somewhat similar to a tank track, which runs from the back of the skis to the back of the snowmobile. The track is used to propel the snowmobile forward in the snow and the skis are used to change the direction of the snowmobile. Traditionally, snowmobiles have utilized a handlebar type steering mechanism instead of a steering wheel type steering mechanism. Usually on the snowmobile driver's righthand side when he or she is seated in the snowmobile seat is the throttle and on the left hand side is the brake. The right hand side of the handlebar usually includes a handle grip adapted for engagement with the glove of the snowmobiler and a throttle, which is adapted to be depressed to accelerate the snowmobile. The thumb of the driver's right hand engages the throttle. The left hand side of the handlebar can likewise include a brake that extends parallel to the handlebar grip directly opposite to the snowmobile.

The natural tendency of snowmobile throttle control levers is for the legs to warp together. When this happens the lever squeezes the control housing, thereby preventing the throttle lever from moving freely. The throttle lever attaches to an axle pin, which actuates an RPS (Runaway Prevention Switch). When the thumb lever is unable to move freely, the RPS switch will not function properly. The thumb lever must also possess the ability to spread so that the legs do not bind, thereby ensuring proper RPS function when the operator provides side-load to the throttle lever.

Based on the foregoing it can be appreciated that when the operator of snowmobile provides a side load to a throttle lever, the throttle lever does not move freely and hence the RPS does not function properly. It is believed that a solution to this problem involves the implementation of a pair of bushings with a hole and closed ends placed on either side of axle pin for maintaining controlled gap between throttle and bushing assembly, which is disclosed in greater detail. This ensures proper functioning of the RPS when the operator provides side-load to the throttle lever.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved throttle controls for recreational vehicles such as snowmobiles.

It is another aspect of the present invention to provide an improved structure for throttle control levers.

The aforementioned aspects and other objectives and advantages can now be achieved as described herein. A snowmobile throttle control apparatus is disclosed, which includes the use of two bushings a hole, one or more closed ends and a separate axle pin. The bushings are assembled to a thumb lever and mounted over the axle pin. The axle pin allows for a controlled gap to be maintained between the throttle lever, bushing assembly and the control housing. Additionally, the thumb lever is allowed to flex open when a side load is applied. Thus allowing the thumb lever assembly to travel without binding on the control housing. This insures proper functioning of the RPS feature.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 5A illustrates a perspective view of a throttle control mechanism for a snowmobile; and FIG. 5B illustrates a sectional view of a throttle control mechanism of snowmobile taken along line A-A of FIG. 5A, in accordance with a preferred embodiment.

DETAILED DESCRIPTION

The particular values and configurations discussed in these non-limiting examples can be varied and are cited merely to illustrate at least one embodiment and are not intended to limit the scope thereof.

Figure 1:
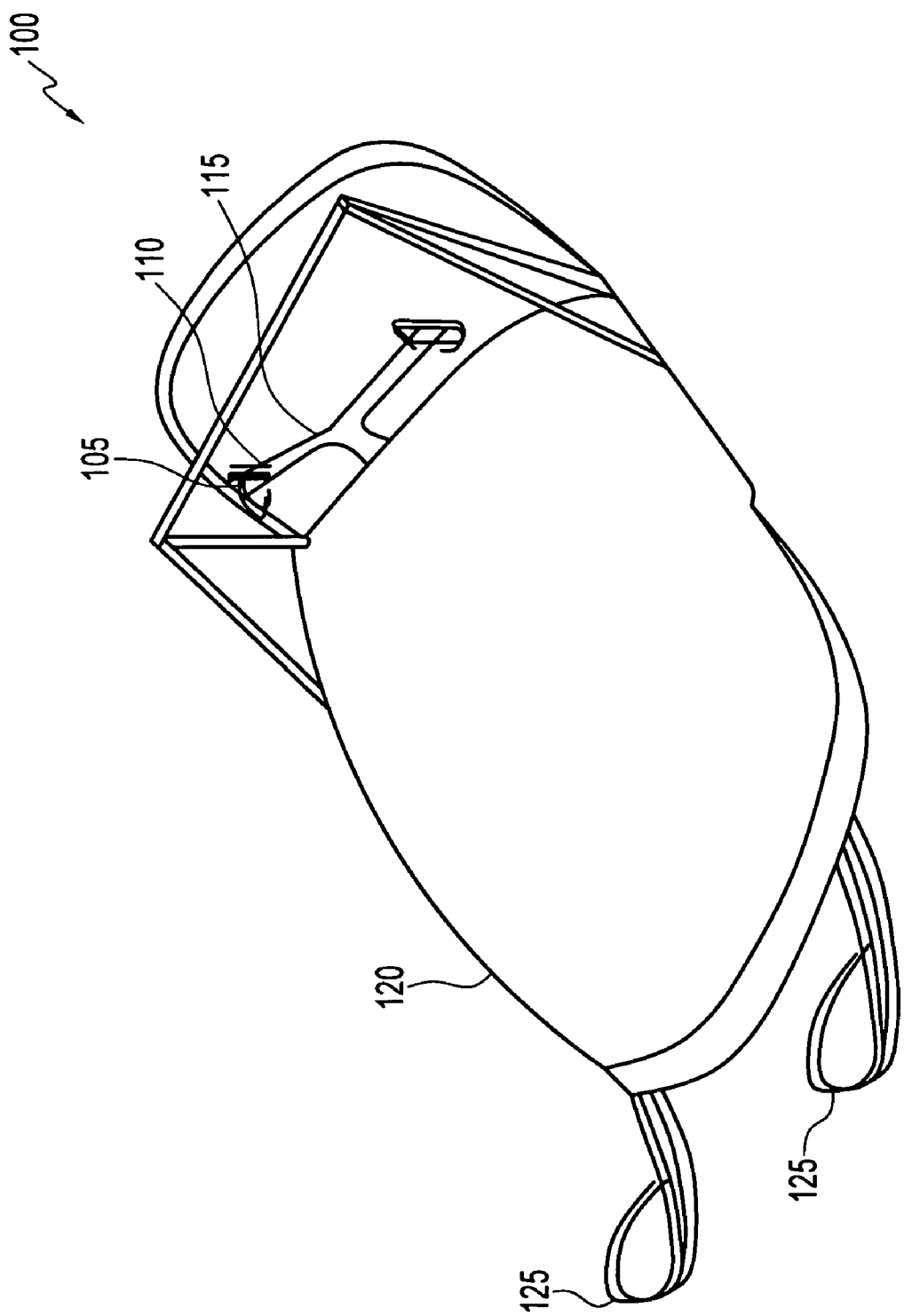
FIG. 1 illustrates a perspective view of a snowmobile, which can be implemented in accordance with a preferred embodiment.

Referring to FIG. 1, a perspective view of a snowmobile 100 is illustrated, which can be implemented in accordance with a preferred embodiment. The snowmobile 100 generally includes a frame 120 having a pair of skis 125 coupled to the forward portion. The RPM of the engine of snowmobile 100 can be selectively adjusted utilizing a throttle lever 110 mounted on a right handle bar 115 of snowmobile 100. A hand grip 105 is generally attached to a right handle bar 115 of snowmobile 100.

Figure 2:
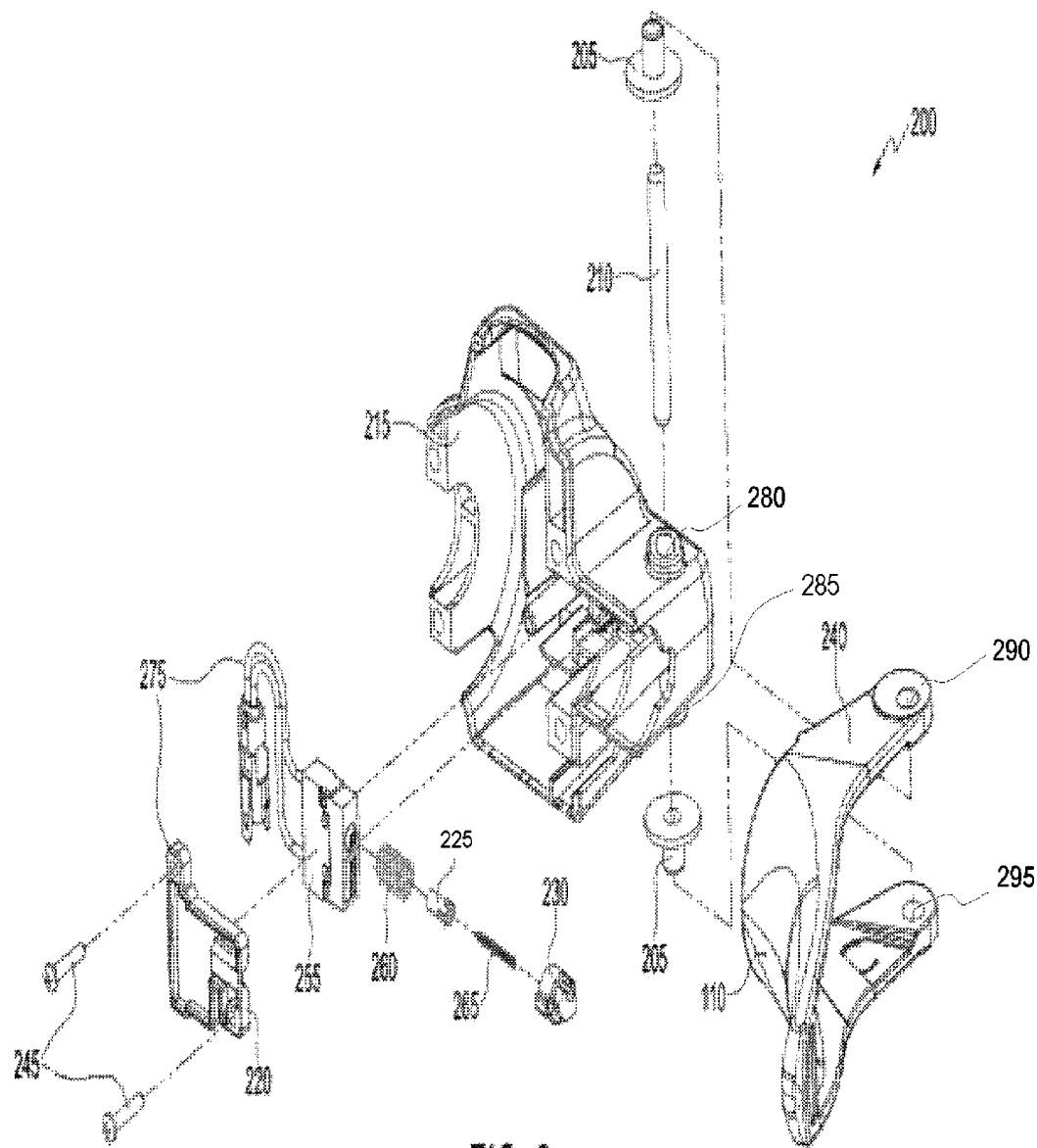
FIG. 2 illustrates an exploded view of throttle control of snowmobile, which can be implemented in accordance with a preferred embodiment.

Referring to FIG. 2 an exploded view of a throttle control mechanism 200 of a snowmobile, such as snowmobile 100 depicted in FIG. 1, can be implemented in accordance with a preferred embodiment. Note that in FIGS. 1-2, identical or similar parts or elements are generally indicated by identical reference numerals. For example, the throttle lever 110 depicted in FIG. 1 also appears in FIG. 2. As depicted in FIG. 2, a Runaway Prevention Switch (RPS) 275 can be provided, which includes a pair of screws 245, a cover 220, a connector assembly 255 containing a micro-switch, an external spring 260, an internal spring 265, a small plunger 225 and a large plunger 230. The RPS 275, throttle lever 110, an axle pin 210, a pair of insulating bushings 205, and holes 280 and 285 are housed into a control housing or case 215. One end of the insulating member (or bushings) 205 is open to receive the axle pin while the other end remains closed. Throttle lever 110 includes mounting holes 290 and 295. The bushings 205 can be assembled to a pair of legs 240 in the throttle lever 110 and mounted over the axle pin 210. The axle pin 210 maintains a controlled gap between the throttle lever 110, insulating bushings 205, and control housing 215.

Figure 3:
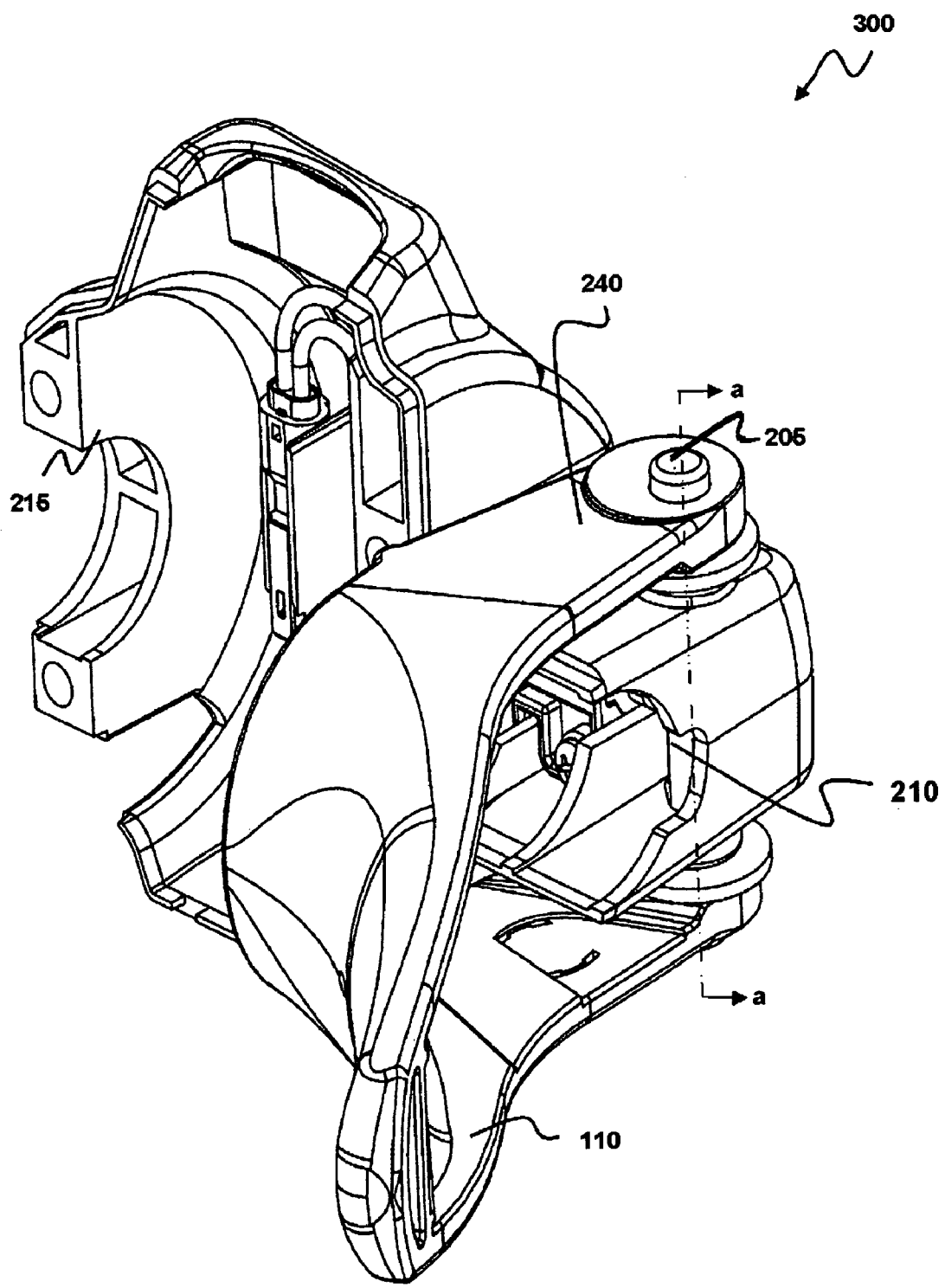
FIG. 3 illustrates a perspective view of a throttle control of snowmobile, in accordance with a preferred embodiment.

Referring now to FIG. 3, a perspective view of a throttle control mechanism 300 for a snowmobile 100 is illustrated, which can be implemented in accordance with a preferred embodiment. The configuration depicted in FIG. 3 is essentially an imploded view of the configuration illustrated in FIG. 2. Note that in FIGS. 1-4, identical or similar parts or elements are indicated by identical reference numerals. Thus, the FIG. 3 illustration also depicts the control housing 215, throttle lever 110, a pair of legs 240, an axle pin 210 and a bushing 205, which are described above with respect to FIG. 2.

Figure 4:
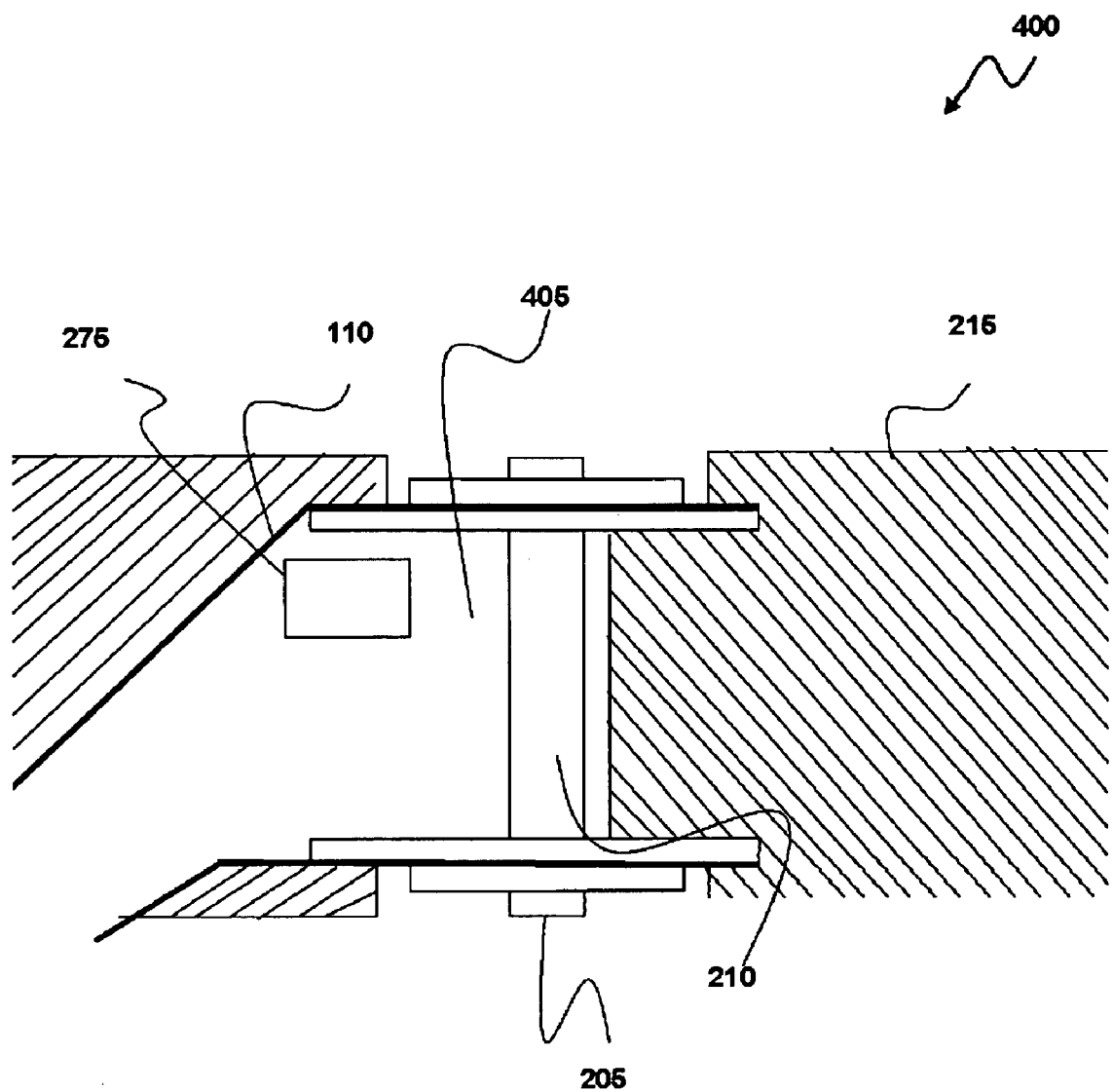
FIG. 4 illustrates a sectional view of a throttle control of snowmobile taken along line 3-3 of FIG. 3, in accordance with a preferred embodiment.

Referring to FIG. 4, a sectional view of a throttle control mechanism 400 of snowmobile 100 is illustrated taken along section line A-A of FIG. 3, in accordance with a preferred embodiment. The configuration depicted in FIG. 4 illustrates the control housing 215, throttle lever 110, a controlled gap 405 between the throttle lever 110, bushing 205, and the control housing 215; a pair of legs 240, an axle pin 210 a RPS 275 and a bushing 205 as depicted previously with respect to in FIG. 2.

Referring to FIG. 5A-5B, FIG. 5A illustrates a perspective view of a throttle control mechanism 502 of snowmobile 100, and FIG. 5B depicts a sectional view of a throttle control mechanism 504 of snowmobile 100 taken along line A-A of FIG. 5A, in accordance with a preferred embodiment. With reference to the perspective view of the throttle control mechanism 502, the cross sectional view of the throttle control mechanism 504 is shown along the lines A-A. Note that in FIGS. 1-5A/5B identical or similar parts or elements are generally indicated by identical reference numerals. Thus, the FIG. 5B illustration also depicts the control housing 215, throttle lever 110, an axle pin 210 and a bushing 205 which are described above with respect to FIG. 2.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A throttle control apparatus, comprising:
    a control housing including an axle hole;
    a throttle lever including a first portion configured for interfacing with an operator, and a second portion having a first leg and a second leg that are configured to facilitate attachment of the throttle lever to the control housing, each of the first and second legs including a hole;
    an axle pin extending through the axle hole of the control housing, the axle pin having a first end and a second end, with the first end extending through the hole in the first leg of the throttle lever and the second end extending through the hole in the second leg of the throttle lever; and
    a first bushing member disposed on the first end of the axle pin, wherein at least part of the first bushing member extends through the hole in the first leg of the throttle lever and over the first end of the axle pin, and wherein another portion of the first bushing member is configured to slidingly engage the first leg of the throttle lever.

2. The apparatus of claim 1 wherein said axle pin is configured utilizing a screw machining process.

3. The apparatus of claim 1 further comprising a runaway prevention switch housed inside the control housing and operatively connected to the throttle lever.

4. The apparatus of claim 1 further comprising a second bushing member disposed on the second end of the axle pin, wherein at least part of the second bushing member extends through the hole in the second leg of the throttle lever and over the second end of the axle pin, and wherein another portion of the second bushing member is configured to slidingly engage the second leg of the throttle lever.

5. The apparatus of claim 4 wherein the first bushing member and the second bushing member each comprises a closed end, an open end, and a flange adjacent to the open end, wherein the closed end of the first bushing member extends over the first end of the axle pin and the flange of the first bushing member is configured to slidingly engage the first leg of the throttle lever, and wherein the closed end of the second bushing member extends over the second end of the axle pin and the flange of the second bushing member is configured to slidingly engage the second leg of the throttle lever.

6. The apparatus of claim 4 wherein said axle pin floats between the first and second bushing members to permit said axle pin to travel without binding to said control housing.

7. The method of claim 4 wherein at least one of said first bushing member, second bushing member, and control housing comprises an injection molded plastic.

8. A snowmobile throttle control apparatus, comprising:
    control housing mounted to a handle bar of a snowmobile, the control housing including a pair of holes;
    an axle pin including a first end and a second end, the axle pin being sized to be received by the pair of holes of the control housing and to extend therethrough;
    a first bushing member disposed about the first end of the axle pin, the first bushing member including a closed end, an open end, and a flange adjacent to the open end;
    a second bushing member disposed about the second end of the axle pin, the second bushing member including a closed end, an open end, and a flange adjacent to the open end;
    a throttle lever including a first leg and a second leg, the first leg including a first opening disposed about the first bushing member such that the flange of the first bushing member is between the first leg and the control housing, the second leg including a second opening disposed about the second bushing member such that the flange of the second bushing member is between the second leg and the control housing.

9. The apparatus of claim 8 wherein said axle pin floats between the first bushing member and the second bushing member to permit the axle pin to travel without binding to said case.

10. The method of claim 8 wherein at least one of the first bushing member, the second bushing member, and the control housing includes an injection molded plastic.

11. The apparatus of claim 8 wherein said axle pin is configured utilizing a screw machining process.

12. The apparatus of claim 8 further comprising a runaway prevention switch housed inside the control housing and operatively connected to the throttle lever.

13. The apparatus of claim 8 wherein the first bushing member and the second bushing member define a controlled gap between the throttle lever and the control housing.

14. A method of configuring a snowmobile throttle control apparatus, for use with a snowmobile, comprising:

providing a control housing and a throttle lever, the control housing including two holes corresponding to two holes in the throttle lever;

inserting an axle pin through the two holes in the control housing, the axle pin having a first end and a second end;

placing a first bushing member on the first end of the said axle pin;

placing a second bushing member on the second end of the axle pin; and inserting the first bushing member in a first of the two holes of the throttle lever and the second bushing member in a second of the two holes of the throttle lever, wherein a portion of the first bushing member is disposed between the throttle lever and the control housing and a portion of the second bushing member is disposed between the throttle lever and the control housing.

15. The method of claim 14 further comprising positioning said axle pin to float between the first bushing member and the second bushing member to permit the axle pin to travel without binding to said case.

16. The method of claim 14 further comprising:

forming at least one of the first bushing member or second bushing member from an injection molded plastic; and configuring the axle pin utilizing a screw machining process.

17. The method of claim 14 further comprising providing a runaway prevention switch inside the control housing.

18. The method of claim 14 further comprising maintaining the relative relationship of the first bushing member and the second bushing member to provide a controlled gap between the throttle lever and the control housing.

19. The method of claim 14 wherein the first bushing member and the second bushing member each include a closed end, an open end, and a flange adjacent to the open end, wherein the flange of the first bushing member is disposed between the throttle lever and the control housing, and the flange of the second bushing member is disposed between the throttle lever and the control housing.

\* \* \* \* \*